(No Model.)  2 Sheets—Sheet 1.

G. A. WATERS.
CAMERA SHUTTER.

No. 526,471.  Patented Sept. 25, 1894.

on line 1-1.

on line 1-1.

Witnesses:
Raymond L. Barnes
F. L. Emm.

Inventor.
G. A. Waters
By Philip T. Dodge
Attorney.

THE NORRIS PETERS CO., PHOTO-LITHO., WASHINGTON, D. C.

(No Model.) 2 Sheets—Sheet 2.
G. A. WATERS.
CAMERA SHUTTER.
No. 526,471. Patented Sept. 25, 1894.
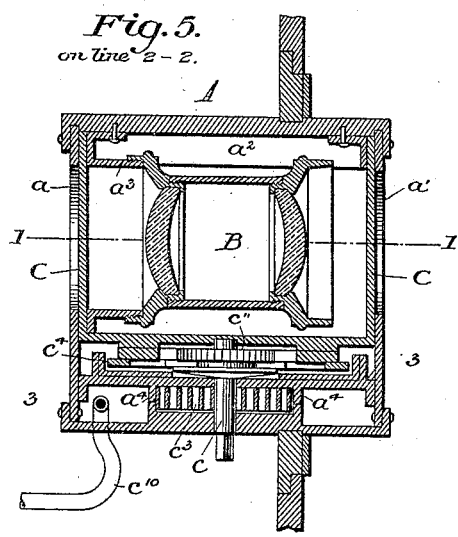
Fig. 5.
on line 2-2.
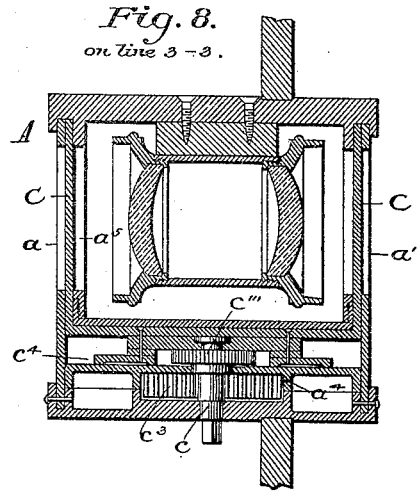
Fig. 8.
on line 3-3.
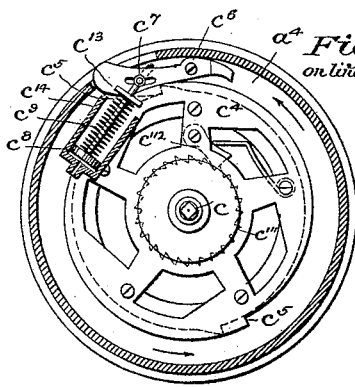
Fig. 6.
on line 3-3.
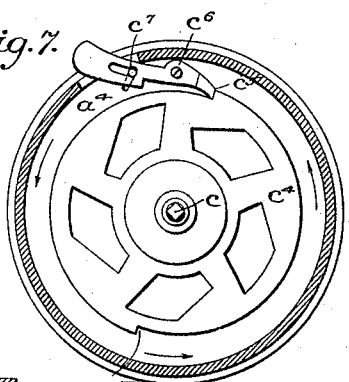
Fig. 7.
Fig. 9.
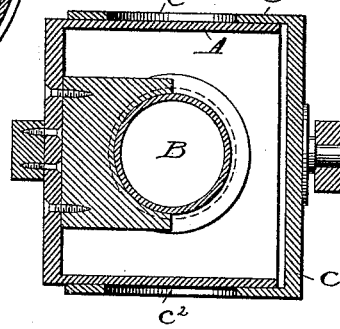
Fig. 10.
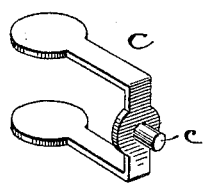
Fig. 11.
Witnesses:
Raymond F. Barnes
G. S. Elmore
Inventor.
G. A. Waters
By Philip T. Dodge
Attorney.

UNITED STATES PATENT OFFICE.

GEORGE A. WATERS, OF LANSINGBURG, NEW YORK.

CAMERA-SHUTTER.

SPECIFICATION forming part of Letters Patent No. 526,471, dated September 25, 1894.

Application filed January 30, 1889. Serial No. 298,145. (No model.)

*To all whom it may concern:*

Be it known that I, GEORGE A. WATERS, of Lansingburg, in the county of Rensselaer and State of New York, have invented certain Improvements in Photographic Shutters, of which the following is a specification.

This invention relates to a shutter having an intermitting rotary motion on an axis at right angles to the focal axis of the lens.

In its preferred style the shutter is made in the form of a hollow cylinder or tube with coincident openings through opposite sides, and is arranged to inclose and revolve completely around a stationary lens so that in the course of its revolution its two openings are carried simultaneously across the opposite ends or faces of the lens to effect the exposure.

The shutter may be turned by hand with a key or similar device on its axis, or it may be combined with a spring and winding mechanism to effect its rotation and with stop devices to limit the rotation, and these stop devices may be actuated by hand or by pneumatic devices as preferred.

The essence of the invention lies in adapting the shutter to revolve around the lens, and across its ends or faces, and in adapting the shutter to close or cover the lens at both ends, and it will be manifest to the skilled mechanic after the examination of the following description and accompanying drawings, that the details of construction may be modified in many respects without departing from the limits of the invention.

In the accompanying drawings the shutter is shown in its preferred form with spring motor devices and pneumatic trip devices.

Figure 1:
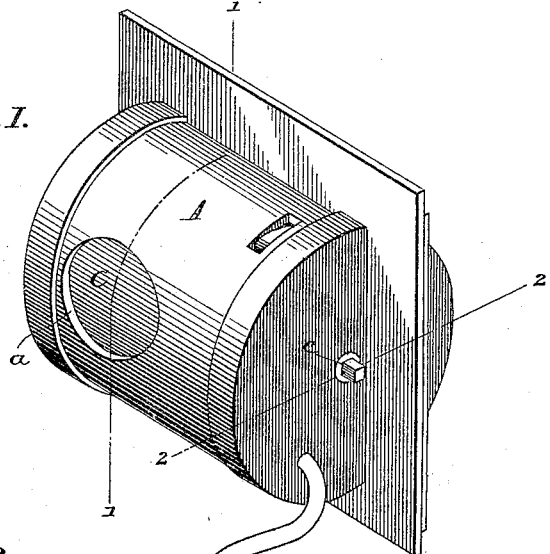
Figure 2:
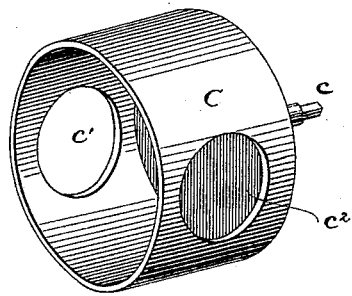
Figure 4:
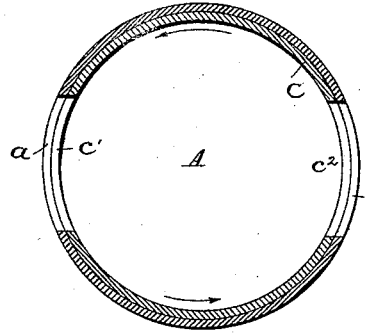
Figure 3:
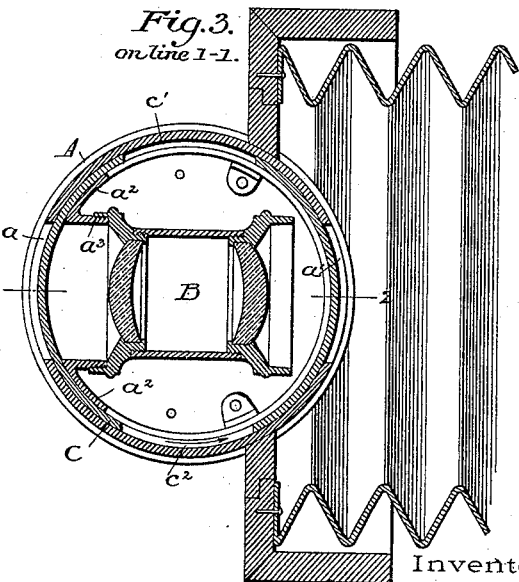

Figure 1 is a perspective view of the shutter mounted on the front of a camera. Fig. 2 is a perspective view of a revolving hollow cylinder forming the shutter proper. Fig. 3 is a vertical section on the line 1—1 of Figs. 1 and 5, the shutter being closed. Fig. 4 is a section on the same line as the preceding figure, showing the position of the parts at the instant of exposure. Fig. 5 is a horizontal section on the line 2—2 of Figs. 1 and 3. Fig. 6 is a vertical section on the line 3—3 of Fig. 5, showing the motor and trip mechanism. Fig. 7 is a diagram illustrating the action of the detent. Fig. 8 is a section showing the shutter in modified form. Fig. 9 is a sectional view illustrating a modified application of my shutter. Figs. 10 and 11 are views illustrating modifications.

Referring to the drawings,—A represents the body of the shutter made in the form of a horizontal hollow cylinder with coincident openings $a$ $a'$ through opposite sides, that is to say, on opposite sides of the center, to permit the passage of the light rays through the lens when the shutter is open.

The body A is provided internally, at short distances from its inner periphery, with a rigid arm or projection, $a^2$, having, coincident with the outer opening $a$, a threaded neck, $a^3$, to which the end of an ordinary photographic lens, B, is firmly screwed.

In the drawings I have shown an ordinary "doublet" or rectilinear lens, that is to say, a lens consisting of a tube with two lenses proper mounted in its opposite ends as usual, but it is to be understood that a photographic objective of any appropriate form may be employed.

It will be observed that the lens is supported rigidly within the body, its axis coincident with the diameter of the body and its two ends opposite the openings $a$ $a'$. Within this body I mount the shutter proper, C, separately represented in Fig. 2, consisting of a hollow cylinder or tube at one end, and provided with a supporting journal or axis, $c$, and provided at the opposite sides with coincident apertures $c'$ and $c^2$. This shutter is inserted endwise into the body A, over and around the lens, and in such manner as to revolve freely but closely around the body.

When the shutter is turned to the position shown in Fig. 4, so that its openings $c'$ and $c^2$, coincide or register with the openings $a$ and $a'$, of the body, both ends of the lens are exposed and the light rays permitted to pass therethrough, but as the shutter is turned its openings are carried around within the body out of register with the openings $a$ $a'$, and its solid portion caused to cover and close said openings. It will be observed that by revolving the shutter intermittingly a fourth of a revolution at a time, it is alternately opened and closed.

It is to be particularly observed that there are two apertures, one at each end of the lens, and that these two apertures are opened and closed simultaneously, thus affording a double security against the passage of light to the interior of the camera. The complete inclosure of the lens by the shutter also insures the protection of the lens from the injurious effect of prolonged exposure to light when not in use.

The journal $c$ is extended through the end of the body, and exposed on the outside so that the shutter may be turned by hand, if desired.

In Figs. 5 and 6 I have shown mechanism for producing rapid exposures. In these figures the journal $c$, instead of being fixed rigidly to the shutter is arranged to turn independently thereof, and is connected thereto through the medium of a ratchet wheel, $c^{111}$, fixed on the inner end of the journal and engaging a spring-actuated pawl, $c^{112}$, on the shutter. A coiled spring, $c^3$, is secured at one end to the journal and at the opposite end to a projection from a rigid wall or partition $a^4$ of the body. These connections are similar to the ordinary winding mechanism of a clock. By turning the journal with a suitable key the spring may be placed under tension without turning the shutter, and when thus wound it tends to revolve the shutter in the direction indicated by the arrows in the drawings. At one end the shutter has a fixed disk or plate, $c^4$, provided on opposite sides of the center with peripheral notches $c^5$. A detent, $c^6$, is pivoted midway of its length to the stationary wall, $a^4$, and arranged to engage at its two ends alternately in the successive notches. At one end this dog is slotted to receive a pin, $c^7$, projecting from a piston, $c^8$, mounted in a fixed cylinder, $c^9$, which latter is in turn connected by a flexible tube, $c^{10}$, with a bulb or air-forcing device $c^{12}$. The piston-rod is guided at one end in a stationary arm, $c^{13}$, and between this arm and the piston-head a spiral spring, $c^{14}$, is applied as shown, so that it tends to throw the hooked end of the detent into engagement with the shoulders of the shutter.

The operation is as follows: When the shutter is in its normal or closed position and the spring under tension the parts stand in the position shown in Figs. 3 and 6. If now the bulb be squeezed it causes the contained air to force the piston $c^8$, backward against the resistance of the spring so as to lift the forward hooked end of the detent out of engagement with the shoulders $c^5$. This releases the shutter which immediately revolves until the next shoulder encounters the rear end of the detent, $c^6$, by which it is momentarily arrested until the piston is relieved from the air pressure whereupon the detent tips to its original position allowing the shoulder to pass forward from its rear end to the hook at its forward end. This form of safety escapement being well-known to the skilled mechanic in other structures need not be further described herein. The shutter makes at each movement a half revolution turning from the closed position shown in Fig. 3, first to the position shown in Fig. 4, so as to cause the exposure, and then by a continued movement to the original or closed position, in order to prevent a second and accidental exposure in the event of the bulb being inadvertently compressed.

The spring $c^{14}$ may be made quite weak. In such case the shoulders $c^5$, acting against the rear end of the detent $c^6$, hold the same in its primary position shown in Fig. 7. With the parts in this position it is necessary to press the end of the detent which is exposed through a slot in the body inward to its position shown in Fig. 6, in order to set the device to be again operated by hand.

The shutter represented in Fig. 8, is practically identical with that shown in the preceding figures with the single exception that it contains in addition to the stationary outside body a stationary inside shell, $a^5$, in the form of a hollow cylinder. This shell incloses the lens and is provided with apertures coinciding with those in the body. It is used simply as an additional means of preventing the leakage of light between the parts into the interior. It will be observed that in this form of the device the shutter proper is inclosed between the inner and the outer cylinder.

In Fig. 9 the construction is essentially the same as that in the preceding figures, except that the stationary body A, of tubular form, is located inside of the tubular shutter C.

Fig. 10 illustrates my shutter with portions of the body removed in order to reduce as far as possible the weight. This will, of course, be used in connection with the cylindrical case or body. The arms of the shutter in the form herein shown correspond to the slotted portions in the other forms, and serve to pass across the two ends of the lens and close the openings in the external body.

It is preferred to have the shutter close the two ends of the lens simultaneously, but in some cases it is considered sufficient to close the two ends alternately and in this case one side or half of the shutter may be omitted, as shown in Fig. 11. As the shutter revolves around the lens in the same manner as in the preceding examples its solid portion will be brought over the two ends of the lens alternately.

While it is preferred to rotate the shutter intermittingly in one direction, it is obvious that it may by hand or by suitable mechanism be given an oscillating motion so as to bring its apertures and its opaque portions alternately opposite the lens.

I believe myself to be the first to revolve a shutter upon an axis transverse to the axis of the lens around or across its outer face and this whether the shutter receives a rotating or an oscillating motion, and I also believe myself to be the first to construct a photographic shutter revolving about an axis in such manner that an opaque portion thereof may be presented across the two ends of the lens alternately, and this I claim whether the device is of such form as to close the two ends of the lens simultaneously or not.

Having thus described my invention, what I claim is—

1. In combination with a photographic lens, a shutter mounted on an axis transverse to the axis of the lens and revoluble completely around the lens substantially as described and shown.

2. In combination with a photographic lens, a rigid support therefor and a shutter mounted on an axis transverse to that of the lens and having opaque portions to cover the two outer ends or faces of the lens simultaneously, and openings between the opaque portions to permit the passage of light through the lens when brought into coincidence therewith.

3. In combination with a fixed support for a lens, a fixed case or body completely inclosing the same, and provided with openings to expose the ends of the lens, and a hollow cylindrical shutter provided with coincident openings in opposite sides and mounted to turn on an axis transverse to the axis of the lens and around the latter.

4. In combination with a photographic lens, an external shutter having opaque portions movable over or across the two ends of the lens simultaneously.

5. The stationary cylindrical body having one end closed and provided with an internal lens support, and having the light openings in its opposite sides, in combination with the internal shutter in the form of a hollow cylinder with openings in opposite sides and projecting journal or spindle whereby said shutter may be revolved.

6. In combination with a stationary photographic lens and the shutter revoluble around the lens on an axis transverse to that of the lens, in combination with a propelling spring and a detent substantially as described.

7. The shutter revoluble on an axis transverse to that of the lens and provided with two stop shoulders, in combination with the detent pivoted midway of its length, and the plunger and spring for actuating said detent.

8. The combination with a photographic lens, of a shutter surrounding the latter and provided with coincident apertures substantially as described.

9. In combination with a photographic lens, a double shutter embracing the lens and mounted on a pivotal support about which it is turned intermittingly to uncover both faces of the lens simultaneously.

10. In combination with a lens and its support, a hollow shutter encircling the lens and provided with coincident apertures, said shutter being pivotally mounted upon the lens support.

11. A pivotal hollow shutter provided with coincident apertures, a motor and stopping and releasing devices, in combination with a lens fixedly supported within the shutter.

12. In combination with a lens and its support, a shutter surrounding the lens provided with a journal at one end and a motor and releasing device located at one end of the shutter.

In testimony whereof I hereunto set my hand, this 28th day of January, 1889, in the presence of two attesting witnesses.

GEORGE A. WATERS.

Witnesses:
ELISHA WATERS,
W. R. BENEDICT.